US005964975A

United States Patent [19]

Hinton

[11] Patent Number: 5,964,975

[45] Date of Patent: Oct. 12, 1999

[54] METHOD AND APPARATUS OF LABELING CYLINDRICAL ARTICLES WITH LABEL HAVING FORMED CURL

[75] Inventor: Gaylen Roy Hinton, Merced, Calif.

[73] Assignee: Trine Labeling Systems, Inc., Turlock, Calif.

[21] Appl. No.: 08/912,570

[22] Filed: Aug. 18, 1997

[51] Int. Cl.$^{6}$ ............................ B29C 65/00; B65C 9/28; B65C 9/00; B65C 11/04

[52] U.S. Cl. .......................... 156/215; 156/285; 156/444; 156/446; 156/458; 156/566; 156/578; 156/DIG. 13; 156/DIG. 26; 156/DIG. 34; 156/DIG. 38

[58] Field of Search .................................... 156/215, 285, 156/306.3, 308.8, 443, 444, 446, 447, 458, 568, 566, 578, DIG. 11, DIG. 12, DIG. 13, DIG. 25, DIG. 26, DIG. 31, DIG. 33, DIG. 34, DIG. 38

[56] References Cited

U.S. PATENT DOCUMENTS

| | | | |
|---|---|---|---|
| 3,834,963 | 9/1974 | Hoffman | 156/215 |
| 4,619,726 | 10/1986 | Cook et al. | 156/366 |
| 4,671,843 | 6/1987 | Olsen | 156/450 |
| 4,714,515 | 12/1987 | Hoffmann | 156/450 |
| 5,045,140 | 9/1991 | Dickey | 156/215 |
| 5,275,678 | 1/1994 | West et al. | 156/215 |
| 5,512,120 | 4/1996 | Hinton et al. | 156/215 |
| 5,855,710 | 1/1999 | Hinton | 156/86 |
| 5,858,168 | 1/1999 | Hinton | 156/566 |

FOREIGN PATENT DOCUMENTS

| | | |
|---|---|---|
| 0 455 377 A1 | 11/1991 | European Pat. Off. . |
| 2 187 163 | 9/1987 | United Kingdom . |
| WO 95/11833 | 5/1995 | WIPO . |

*Primary Examiner*—David A. Simmons
*Assistant Examiner*—J. A. Lorengo
*Attorney, Agent, or Firm*—Morgan & Finnegan, L.L.P.

[57] ABSTRACT

A method and apparatus of labeling cylindrical articles feeds labels onto a label drum. The labels have a formed curl such that the leading edge tends to curl away from the surface of the label drum. The article is fed onto the label drum and wrapped by engaging the article with the leading edge of the label and then wrapping the article. An uncut label web can be fed over an edge to impart the desired curl to the label web. The label web is then cut into labels, which are fed onto the label drum. Also, the tension of the label over the edge can be varied so as to vary the amount of curl imparted to the label.

45 Claims, 9 Drawing Sheets

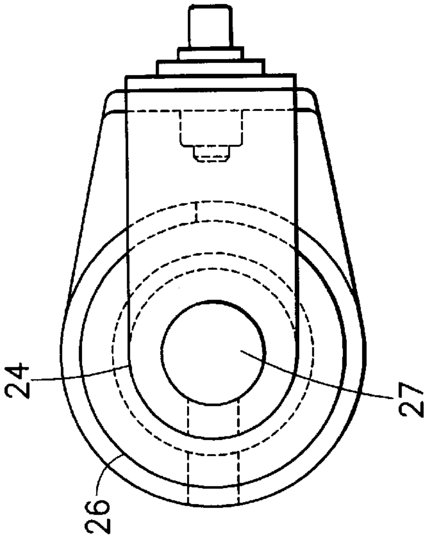
FIG.3
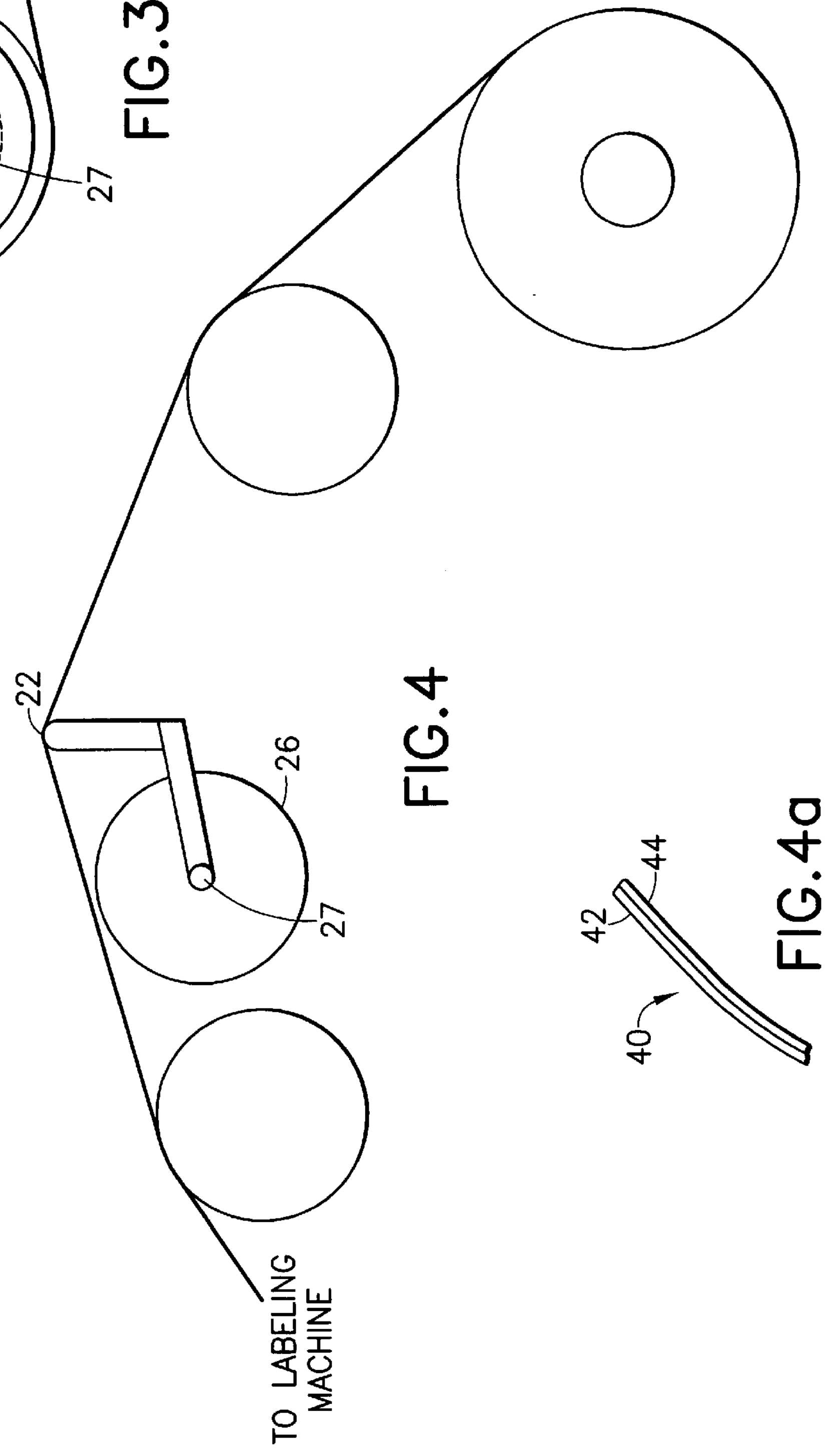
FIG.4
FIG.4a

METHOD AND APPARATUS OF LABELING CYLINDRICAL ARTICLES WITH LABEL HAVING FORMED CURL

FIELD OF THE INVENTION

This invention is related to a method and apparatus for labeling containers by wrap-around labeling using a label having a formed curl.

BACKGROUND OF THE INVENTION

It is known to label containers by wrap-around labeling using an adhesive on the trailing and leading edges. An article is fed on a label drum and engages the leading edge of the label. The article is wrapped until the trailing edge overlaps the leading edge. Because of the recycling demands common in many parts of the world (sometimes even required by law), bottles and containers are recycled or reused. When these containers are recycled or reused, the old label is stripped from the container. Because the leading edge of the label may have been secured by an adhesive onto the container, after label stripping, often a residue of adhesive from the leading edge is retained on the container, making subsequent labeling difficult. It is now known that some labeling applications use a minimum amount of adhesive and sometimes even no adhesive on the trailing edge and the medial portion located between the trailing and leading edges. Such applications could include a glueless leading edge process where no adhesive is contained on the leading edge and air pressure blows the label around the article. Other methods could include electrostatic attraction, wet adhesion using the capillary action, and the application of a minimum amount of adhesive. In any method, however, at times it is difficult to label an article because the leading edge of the label tends to be biased away from the article.

It would be advantageous if such labeling methods described above could overcome the deficiencies where the leading edge does not adequately retain on the article. The application of such a system could be used with a glueless leading edge having an air blow for assisting the leading edge of the label against the article, electrostatic labeling, wet adhesion where moisture and water is applied onto the article or label to help retain the label onto the article, or an adhesive system where adhesive may be applied onto the leading and trailing edges.

SUMMARY OF THE INVENTION

In accordance with the present invention, a method of labeling cylindrical articles and its associated apparatus feeds labels onto a label drum. The labels have a formed curl such that the leading edge of the label tends to curl away from the surface of the label drum. An article is fed onto the label drum and then wrapped by engaging the article with the leading edge of the label. An uncut label web is fed over an edge such as formed on the top of a bar to impart a desired curl to the label web. The label web is cut into labels and the cut labels are fed onto the label drum. The tension of the label web over the edge can vary so that the amount of curl imparted to the label is varied. The curl can be imparted to the label by imparting curl to a label web before winding the label web into a finished roll to be used by a labeling machine.

In another aspect of the present invention, an adhesive could be applied to the leading edge of the label while maintaining the area of the label adjacent to the leading edge free of the adhesive. The label as a whole could also be devoid of adhesive and could be applied either by wet adhesion where moisture and capillary forces are used to retain the label, or by a blowing system using pressurized air initially blows the leading edge against the label. The curl formed in the label assists in the blowing operation. This curl could be formed such that it is biased to curl into a diameter approaching the diameter of the finished article or smaller. Any greater amount of curl can actually hold the label even more tightly into position during the initial labeling operation.

In accordance with another aspect of the present invention, a label web is formed as a finished roll and is adapted for cutting into labels. The finished roll is formed as a thin film plastic label web having a biased curl formed within a label web such that when cut into labels having leading and trailing edges, and then fed onto a label drum, at least the leading edge is biased upward away from the surface of the label drum. The curl can be biased to curl into a diameter approaching the diameter of the finished article.

DESCRIPTION OF THE DRAWINGS

The foregoing and other objects and advantages of the present invention will appreciated more fully from the following description, with references to the accompanying drawings in which:

FIG. 3 is a side elevation view of the feed roller and bar of FIG. 2.

FIG. 4 is a schematic drawing showing the relative positions of the bar and a plurality of feed rollers.

FIG. 4*a* shows a piece of laminated label web manufactured at a converter where a first layer has greater tension than a second layer to impart a curl in the completed laminated label web.

DETAILED DESCRIPTION OF THE INVENTION

Containers are labeled by a wrap-around labeling process where the labels have a formed curl so that the leading edge tends to curl away from the surface of the label drum. The process can use a labeling machine such as the type illustrated in FIG. 1, which shows a general schematic plan view of a labeling machine mounted on a mounting surface or generally flat table top 11. Such labeling machine 10 can be a series 4500 or 6500/6700 manufactured by Trine Manufacturing Company, Inc. of Turlock, Calif.

The method of labeling cylindrical articles in accordance with the present invention uses a label having a formed curl so that the leading edge tends to curl away from the surface of the label drum. When an article is fed onto the label drum, the leading edge curls outward from the label drum, such as when little or no vacuum is applied onto the leading edge. Thus, the leading edge can be applied more readily onto the article, such as in a glueless leading edge process. An air blow assists in moving the leading edge against the article. The present invention can be used for a number of different types of labeling processes, such as electrostatic labeling, where an electrostatic charge is to be applied onto the label drum or label, an air blow in a glueless leading edge process, water assist where the natural adhesion of moisture retains the label onto the article, or an adhesive process where a small amount of adhesive initially "tacks" the leading edge onto the article.

Manufacturers of a label web used for most labeling applications manufacture their label webs in roll form at a converter. The label web is manufactured so that any label is substantially flat when it is positioned on a flat surface. The present invention is much different from the normal standards of a label web because a curl is imparted to the label web either at the converter itself (such when a laminated label is formed from two distinct label webs having different tension) or after feeding the label web into a labeling machine.

Figure 2:
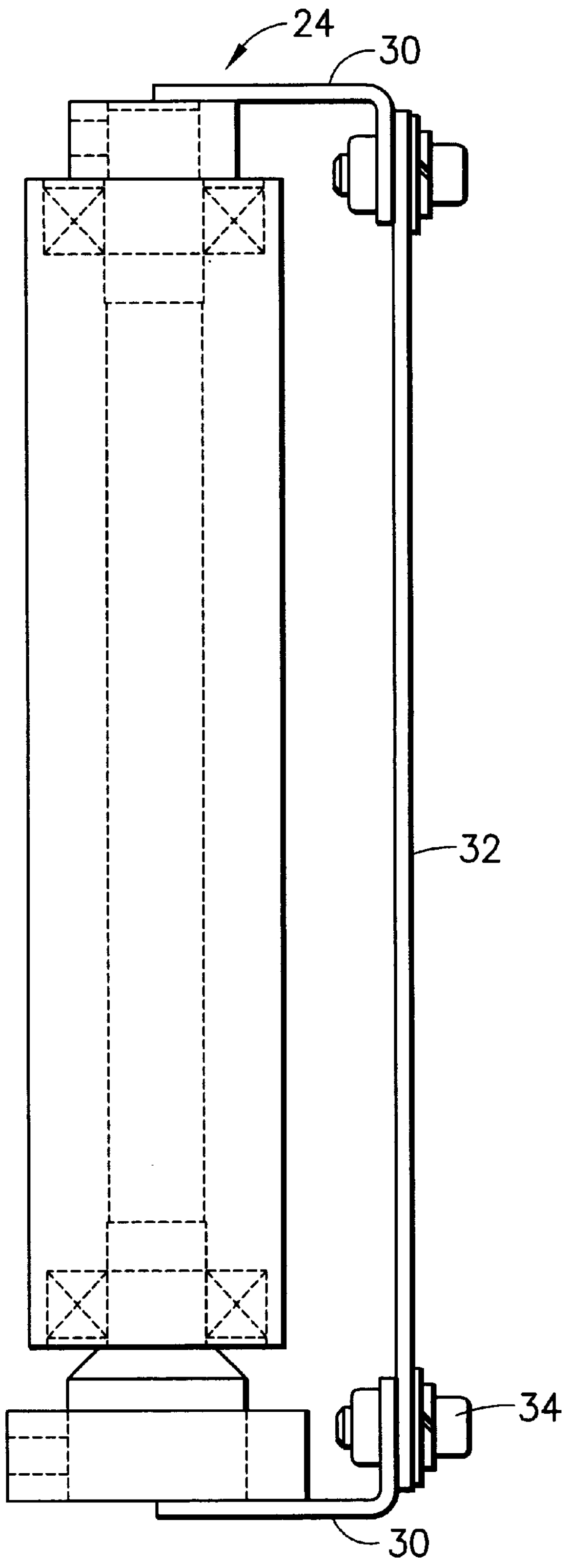
FIG. 2 is a plan view of a feed roller having a bar pivotally connected to the feed roller and forming an edge over which a label web is fed to add a curl.

As shown in FIGS. 2–4, the labeling machine can include a bar 20 forming a top edge 22 over which a label web is moved. The bar 20 is connected by a pivot assembly indicated generally at 24 to a feed roll 26. As shown in FIGS. 2 and 3, the feed roll 26 includes a central hub 27 over which the feed roll 26 rotates. The pivot assembly 24 includes two pivotally mounted lever arms 30 and a straight bar 32 connected by bolts 34 to the lever arms 30. Thus, it is evident that the bar 32 can be pivoted in various positions, thus adjusting the amount of tension applied onto the label web and changing the amount of curl imparted onto the label web. When the label web is cut, the curl is retained on the cut label.

The label desirably is formed such that the curl is biased into a diameter approaching the diameter of the finished article or smaller. This is evident in FIG. 11 where the curl on the illustrated glueless leading edge labeling process curls around the article in an amount approaching the diameter of the article. Curl could also be imparted to a label web directly at a converter, before the label web is formed into a finished roll. For example, as shown in FIG. 4*a*, a piece of label web 40 is shown on formal from first and second laminated layers 42, 44. The first and second layers 42, 44 are fed under tension and then bonded to each other, as is known to those skilled in the art. However, the second layer is fed under greater tension so that the finished label web has a desired amount of curl.

There is now described a labeling method as shown in FIGS. 1 and 5–12 using a glueless leading edge process where no adhesive is applied onto the leading edge and an air blow and formed curl assist air blow onto the article. The article is shown as having a convex surface to be labeled. The different articles to be described will hereinafter be described as containers, and the description will proceed with reference to the beverage containers.

The containers are labeled by the improved method and apparatus as explained below where the air is blown from a first position on label drum onto the leading edge of a label at an angle to the label drum surface and in a direction backward along the label from the leading edge to force the leading edge of the label against the container. The curl formed in the label helps to assure that the label will not be biased away from the article, especially with thicker, laminated labels, or foam labels.

The air is blown at an angle from the drum surface to ensure that the air is blown substantially toward the center of the container. This blown air forces the label to follow the container as it rotates. If the blow-off was straight as in prior art systems, then the label may initially transfer onto the container, but the leading edge of the label would not be held onto the container as the container rotates through its first one-half rotation after meeting the leading edge of the label.

The leading edge of the label is also maintained on the container while rotating through the last one-half rotation until the trailing edge is bonded to the leading edge. This maintaining of the leading edge onto the container can be accomplished by wet adhesion, where the attractive forces, such as induced by capillary action, holds the leading edge of the label against the container. The liquid could initially be contained on the container through the natural condensation experienced in some production plants, or could be deliberately added during delivery of the containers to the label drum.

The leading edge of the label can be maintained against the container by blowing air onto the label and container at a first angled position from the side opposite the label drum to maintain the leading edge of the label against the container while the container rotates. Typically, the air is blown at an angle from a roll-on pad spaced from the label drum.

In accordance with the present invention, air can be blown from a second position on the label drum spaced from the first position and onto the label and container at an angle to the label drum surface to maintain a laminar flow of air against the label and maintain the label tight against the container during container rotation. Air can also be blown from a third position on the label drum spaced from first and second positions onto the leading edge of the label after the container has rotated almost 360 degrees to maintain the label tight against the container during the final part of the wrapping process until the container is wrapped. This is advantageous for labeling with stiff labels. Air is blown onto the label and container from a first angled position on the side opposite the label drum to aid in maintaining the leading edge of the label against the container, while also blowing air from a second angled position on the side opposite the label drum to maintain the label tight against the container during the final part of the wrapping process.

As a container is fed, it is rotated between the label drum and a stationary roll-on pad. Air is again blown at an angle to the surface of the roll-on pad to ensure that the air is blown substantially toward the center of the container, which forces the label to follow the container as it finishes the wrap.

Additionally, the blown air has a tendency to flow in a laminar fashion under the label at either the label drum or the roll-on pad. This laminar flow of air under the label creates a Bernoulli Effect, causing higher air pressure on top of the label and a biasing effect on the label toward the label drum or toward the surface of the roll-on pad. The laminar flow of air under the label can be minimized by flowing the air over a notch or slot formed in the surface of the label surface or the surface of roll-on pad. If the surface of the roll-on pad is rough, air can be directed at an angle and also straight-off from the pad to create turbulence and minimize the flow of under the label.

There will now described in greater detail an embodiment of the machine and method of the invention.

A link belt conveyor 112 moves containers or product packages 113, 114 toward the labeling machine 110 in the direction of arrow 115. The labeling machine 110 is designed to apply labels to containers that have a broad range of sizes, or diameters for cylindrical containers. Among this spectrum of container sizes that the labeling machine 110 can process is a midsize container such as a sixteen ounce container that is intermediate between the maximum and minimum container sizes that the machine 110 will label. The machine can label other container sizes such as two or three liter or even smaller size six ounce containers. Sometimes the containers can be filled and capped before labeling. The container can be dry or wetted. Thin layer labels could adhere to the container if the container had a thin layer of water or other liquid. This label adherence could even occur in some instances without air blown from a side opposing the label drum. Water could be from condensation or optional water spray 115*a*.

Containers on the conveyor 112 are first received in the labeling machine 110 by a star wheel assembly 132. The containers 113, 114 may have a thin layer of water such as from condensation by soaking, spraying immersion or other means, although the practice of the invention does not necessitate a water layer. The star wheel assembly 132 moves containers 113, 114 in the direction of the arrow 115 toward a roll-on pad assembly 116. In cycling the containers 113, 114 through the labeling process, the star wheel assembly 132 brings the containers past the roll-on pad assembly 116, which imparts a counter-clockwise rotation to these containers in the direction of the arrow 121. The roll-on pad assembly 116 generally has an arcuate guide 124 that is covered with resilient padding 126 formed from silicone, urethane, rubber or similar material. The resilient padding 126 grips the containers and forces them to rotate in the desired direction.

Figure 1:
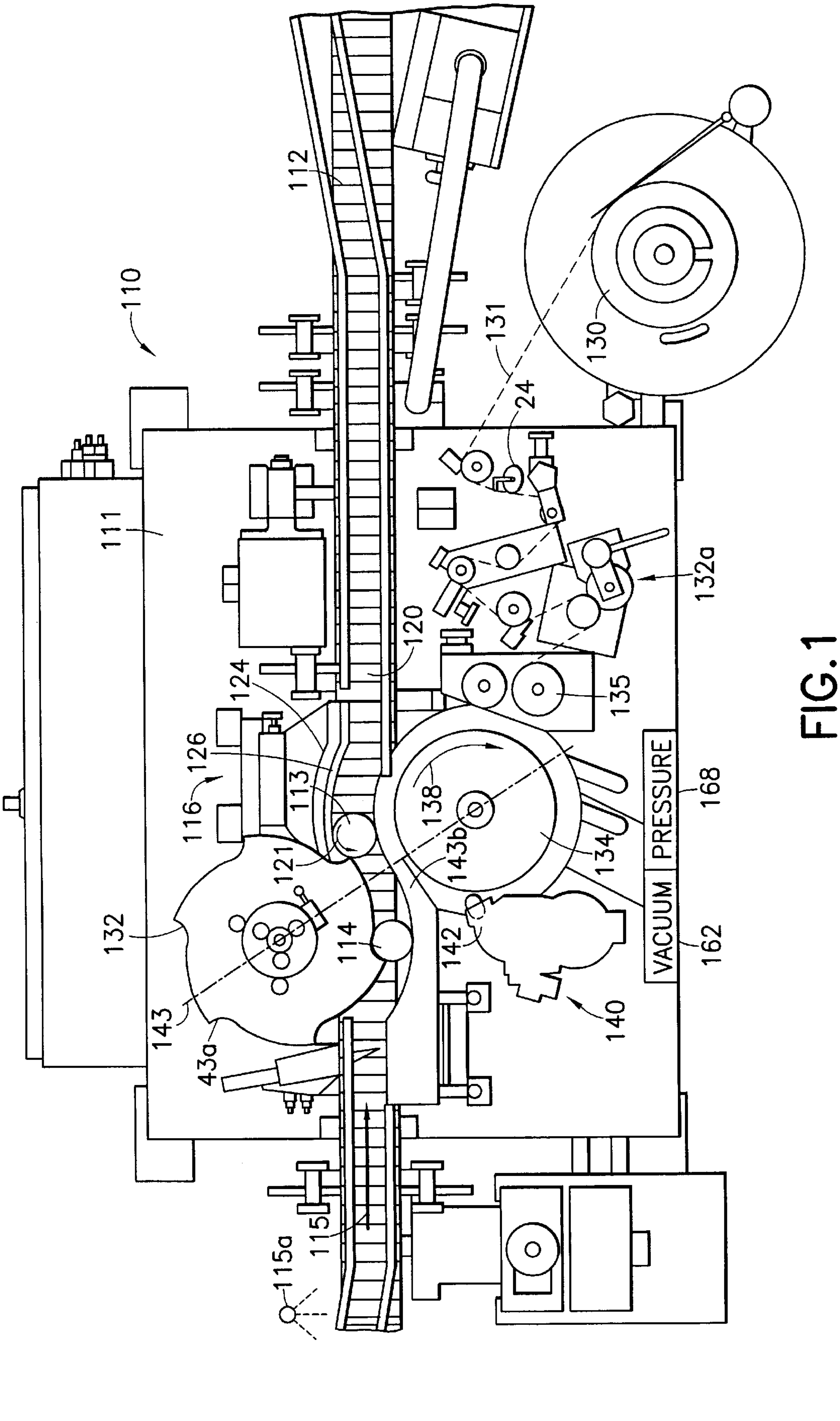
FIG. 1 is a plan view of a labeling machine characterizing features of the present invention.

As shown in FIG. 1, a roll of labels 130 provides a web 131 of labels that is drawn through a feed roller system 132*a* to a cutter 135, which could be a cutter drum (not shown in detail). In accordance with another aspect of the invention, the cutter 135 is placed close to the cylindrical label drum 134 that has a perforated surface containing orifices through which vacuum and pressure are drawn and expelled to retain a label thereto and later blow the leading edge into engagement with a container. Vacuum and pressure can be drawn and expelled by using various port or solenoid valve systems. However, after many cycles, typically solenoids become inoperable. A more efficient apparatus uses manifolds on a hub such as the type disclosed in U.S. Pat. No. 5,344,519 to Galchefski, et al., the disclosure which is hereby incorporated by reference in its entirety.

The web is drawn through the feed roller system 132*a* and pressed against the cutter 135 having a vacuum drawn within the cutter. The cutter rotates and a cutter blade (not shown), protruding from the cylindrical surface of the cutter, presses against the web to cut the web into individual labels "L", having respective leading and trailing edges 127, 128.

Several labels (not shown in FIG. 1) are retained on the label drum 134 and rotated in the direction of arrow 138 on the label drum 134 to an adhesive applicator 140, which includes a glue roller 142. Adhesive can be applied to the surface of the label that is exposed on the label drum by the glue roller 142, and in accordance with the present invention, applied onto the trailing edge of the label. The label drum 134 rotates the leading edge of the label to a point where the leading edge of the label is approximately in alignment with a line 143 between the rotational axis of the drum and the star wheel assembly. As illustrated, the line 143 also coincides with the termination of an arcuate feed guide 143*b*.

The container is pushed by a cusp 143*a* of the star wheel 132 until air blow causes the leading edge of the label to be engaged to the container and the label wraps itself around the container. The container continues its counter-clockwise rotation as indicated by the arrow 121.

Figure 5:
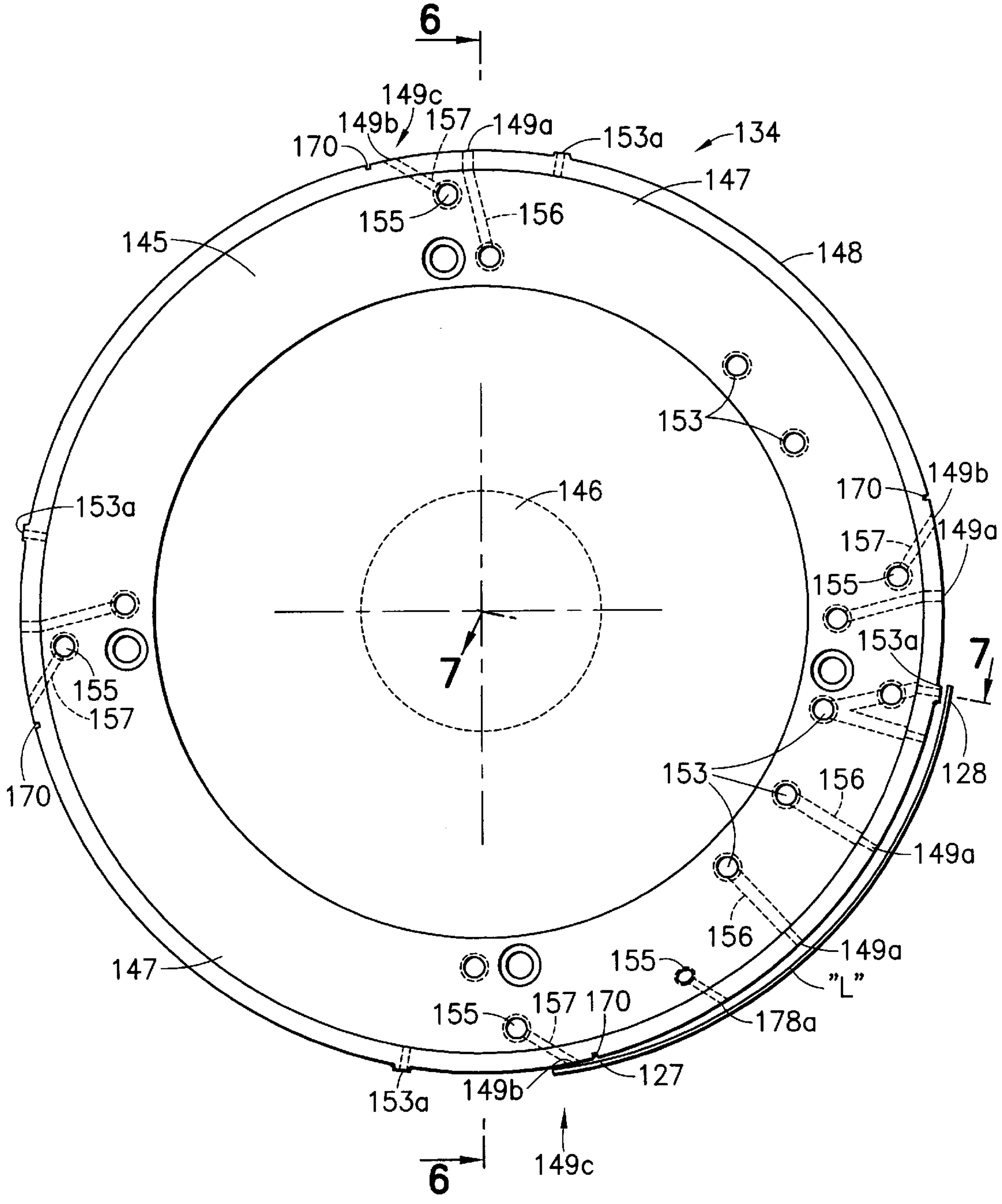
FIG. 5 is a schematic, sectional view of a label drum showing the configuration of the various pressure and vacuum ports.
Figure 6:
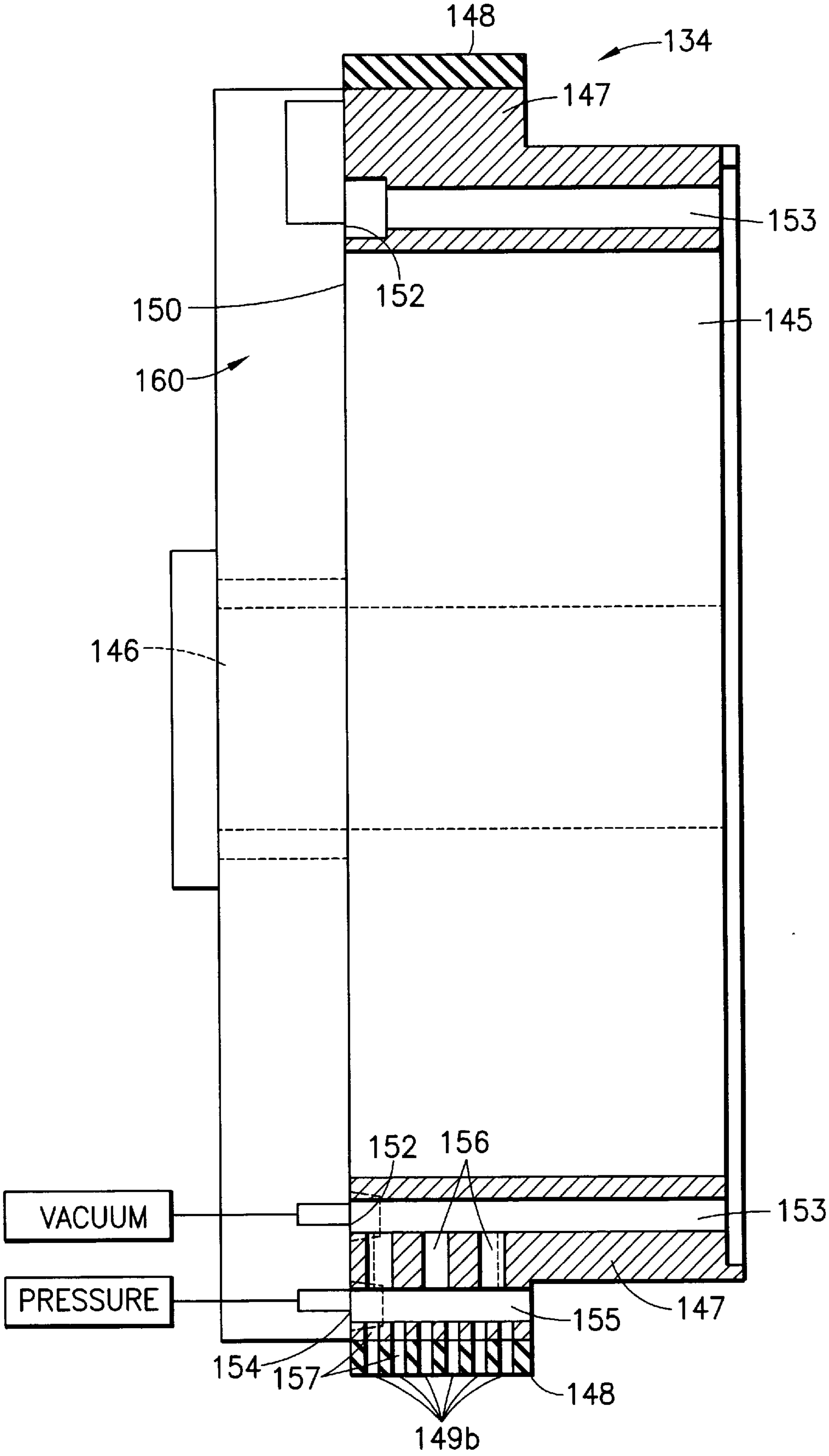
FIG. 6 is a schematic sectional view of the label drum taken along line 6—6 of FIG. 5 and showing a hub rotatably secured to the label drum which allows vacuum and pressure porting.
Figure 7:
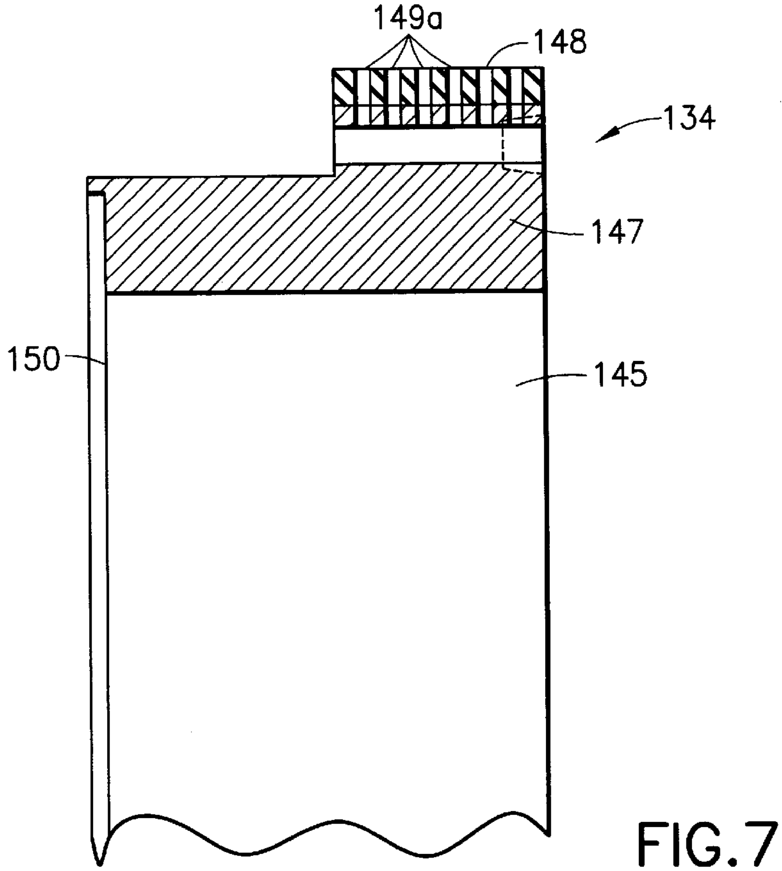
FIG. 7 is a partial, schematic sectional view of the label drum taken along line 7—7 of FIG. 5.

As shown in FIGS. 5 and 6, the label drum 134 includes a rotatable outer drum member 145, which is rotatably mounted on a hub 146. The drum member 145 includes an outer support surface 147 having a rubber, polyurethane or other resilient material mounted on the outer support surface to form a smooth surface 148 on which the labels rest. Thus, the labels "L" are not damaged by the high speed operation of the machine. Air and vacuum are drawn or expelled though orifices 149*a*, 149*b*, which are formed on the surface 148. The orifices 149*a*, 149*b* are positioned in an area of the surface 148 on which a label is held.

The rotatable drum member 145 is rotatably mounted to the hub 146, which is secured to a machine frame (not shown). The rotatable drum member 145 includes a side flange surface 150 having an inner set of port openings 152 communicating via a manifold 153 with orifices 149*a* on the surface 148 where the trailing edge 128 of a label is positioned. That portion of the label drum surface where the trailing edge 128 of the label lies is partially raised to form a protrusion 153*a* which raises the trailing edge of the label slightly to contact the adhesive roller 142. An outer set of port openings 154 communicate via a manifold 155 with the orifices 149*b* on the surface 148 where the leading edge 127 of a label lies. Each manifold 155, 156 communicates via respective air channels 156, 157 to the respective trailing edge and leading edge sets of orifices 149*a*, 149*b*.

The hub 146 has secured thereto a fixed vacuum drum flange 160 (FIG. 8), which has a circumferentially extending trailing edge vacuum manifold 161 aligned with the inner port openings 152. A source of vacuum 162 is connected to the trailing edge vacuum manifold 161 and draws a vacuum within the manifold, the air channel 157 and through orifices 149*a* in order to draw a vacuum on the area under the trailing edge of the label to retain a label on the label drum as the drum member 145 rotates about its axis and against the fixed vacuum drum flange 160.

Figure 8:
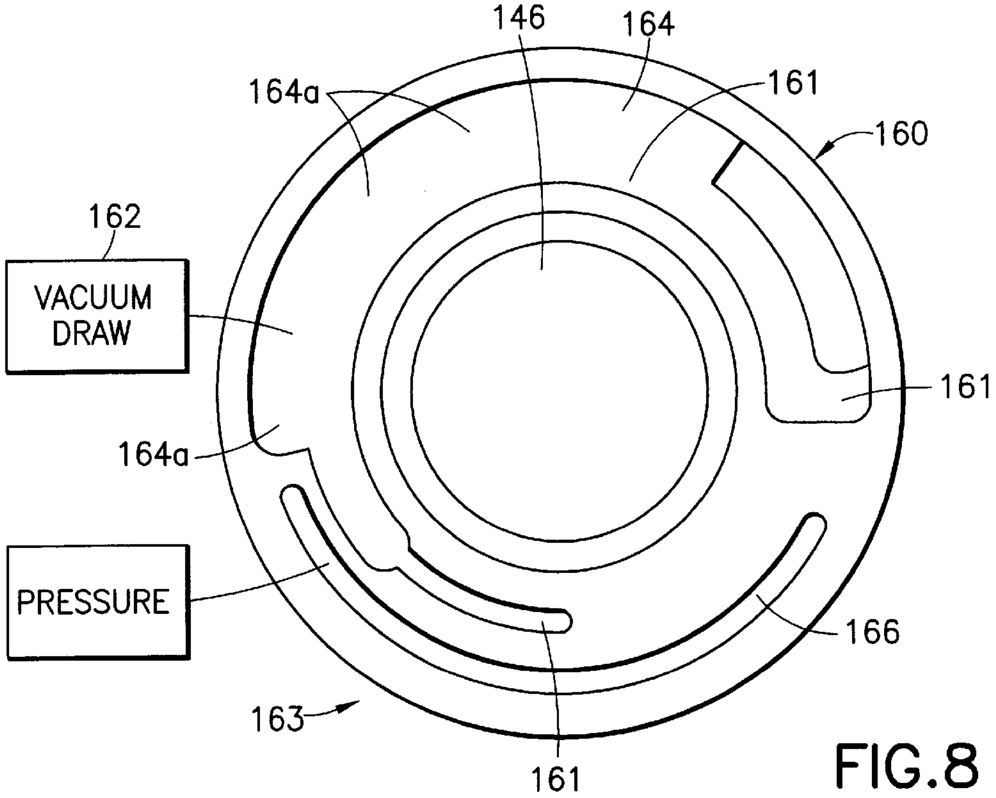
FIG. 8 is a schematic, sectional view of the hub showing various vacuum and pressure ports.
Figure 9:
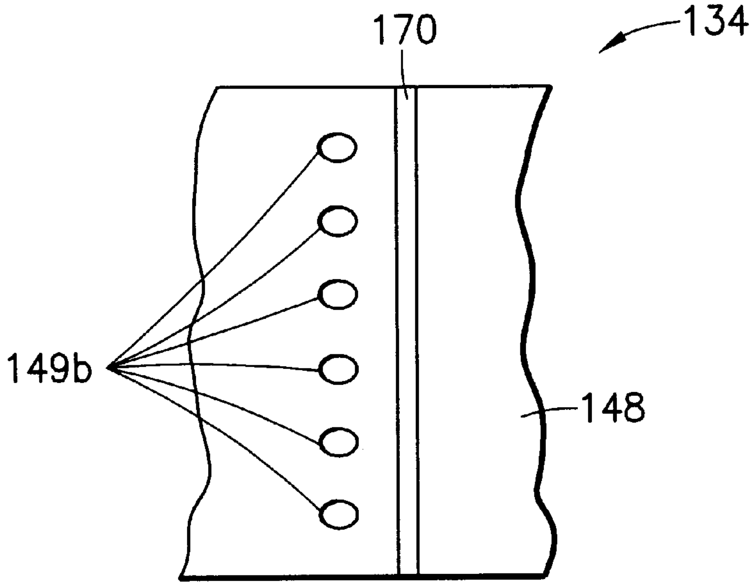
FIG. 9 is a plan view of a portion of the label drum surface showing the angled orifices and the slot adjacent the orifices for minimizing laminar flow of an under the label.
Figure 10:
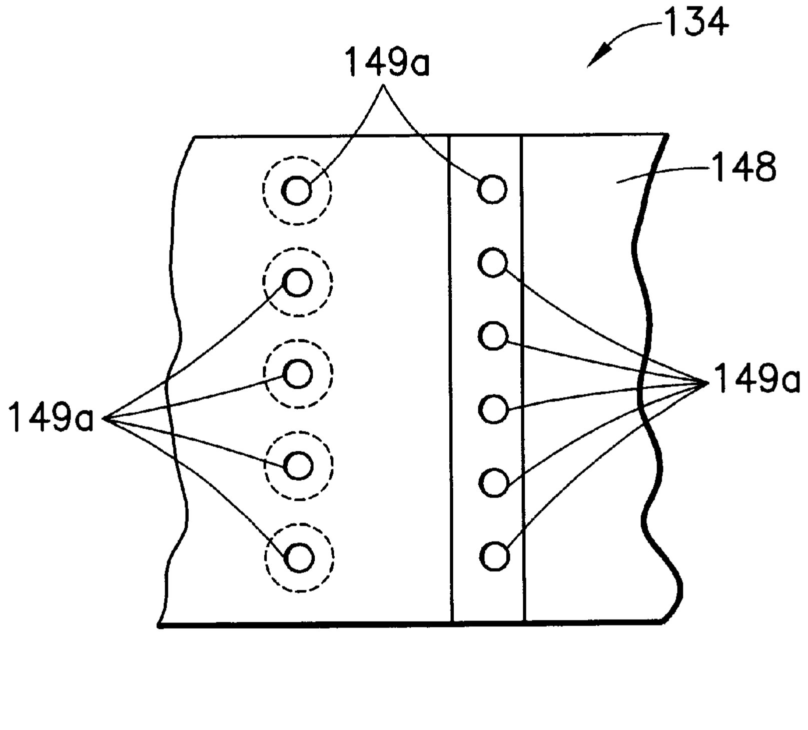
FIG. 10 is another plan view of a portion of the label drum surface showing vacuum ports.

As shown in FIG. 8, the trailing edge vacuum manifold 161 extends circumferentially to a point where vacuum is maintained on a trailing edge 128 of the label until the label is completely wrapped around the container. The trailing edge vacuum manifold 161 also includes a larger or widened portion 164 to form a first leading edge vacuum manifold 164*a* that is aligned with outer port openings 154, and leads to the manifold 155, air channel 157, and orifices 149*b*. Initially, vacuum source 162 draws a vacuum within both sets of port openings for retaining both the trailing edge 128 and leading edge 127 to the drum surface as the label moves into a label wrapping position 163. A leading edge pressure manifold 166 is aligned with the outer port openings 154 and extends after the leading edge vacuum manifold 164*a* to a point where air pressure is applied by a source of air pressure 168.

When the outer drum member 145 has rotated so that the leading edge of the label approaches the label applying position 163, the outer port opening 154 aligned adjacent the pressure manifold 166, terminates the vacuum draw but blows the air through orifices 149*b*. As shown in FIG. 5, the leading edge orifices 149*b* extend into the label drum surface and are angled relative to that surface 148 so that the air is blown out of the orifices 149*b* at an angle as described before. The trailing edge orifices on the other hand, extend straight into the surface 148 to the manifold 153.

Figure 11:
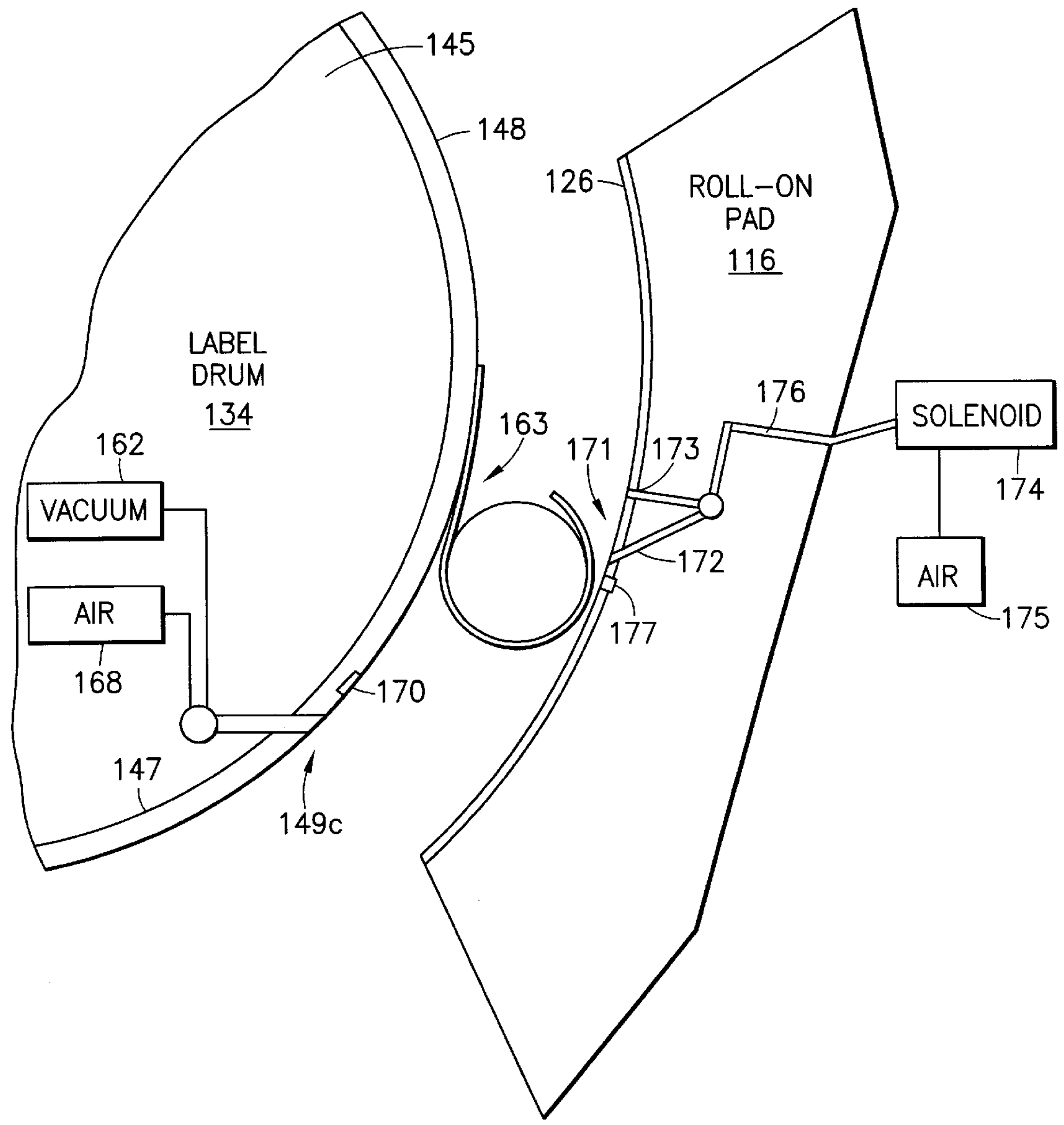
FIG. 11 is a schematic view showing a partially wrapped container fed between the roll-on pad and label drum.

When the label drum 134 rotates and moves the leading edge 127 of the label "L" into a label applying position 163, air is blown from this first position, indicated generally at 149*c*, and through the orifices 149*b* onto the leading edge of the label at an angle to the label drum surface 148 and in a direction backward along the label from the leading edge to force the leading edge 127 of the label against the container (FIGS. 5 and 11). To minimize the biasing of the label toward the drum surface caused by the laminar flow of air under the label, the air is blown over a slot 170 formed in the drum surface 148 (FIGS. 5, 9 and 11), which minimizes the laminar flow of air and under the label.

Because the orifices are drilled in a rubber, urethane or similar material, the orifices may have an hourglass shape, which could enhance a laminar flow from the orifices 149*b*. The laminar flow causes the air to flow under the label and creates the Bernoulli Effect, causing a higher air pressure on top of the label, and thus biasing the label against the surface of the label drum. This is not a desirable effect because the leading edge of the label will not transfer onto the container. The air flowing over the slot 170 can create turbulence, thus minimizing the laminar flow of air under the label. Also, as the container is rotated between the roll-on pad and label drum (FIG. 11) the angled blow of air from the leading edge orifices 149*b* maintains the leading edge of the label on the container 113 because the air is directed against the center of the container.

As the container rotates further, the leading edge of the label can be maintained on the container by several means, including wet adhesion caused by the capillary action of the water acting as a temporary adhesive, thus retaining the leading edge on the container as the container rotates. Wet adhesion is particularly advantageous with thin layer labels.

Alternatively, air flow from opposite the label drum could be used. A timer causes air to flow from the roll-on pad onto the leading edge at a point when the leading edge is adjacent to the roll-on pad. In the illustrated embodiment of FIG. 11, the air can be forced through two sets of orifices 172, 173. The first set 172 is located at a first angled position 171 and is formed to blow air at an angle toward the container and label, and the second set 173 is spaced from the first angled position and formed to blow air straight outward from the roll-on pad 116. The flow of air from the two sets of orifices 172, 173 minimizes the laminar flow of air under the label and minimizes any biasing of the label against the surface of the roll-on pad. If the roll-on pad has a rough surface, then the two channels as illustrated are preferred. If the roll-on pad has a smooth surface, then only one angled set of orifices 172 at the final angled position could be used, and a slot 177 could formed in the roll-on pad to minimize the laminar flow of air under the label.

Various other means and methods also could be used to minimize the laminar flow under the label near the label drum or the roll-on pad. However the above described techniques have been found useful for reducing the laminar flow of air under the label, thus reducing any biasing of the label toward the label drum or roll-on pad.

In accordance with the present invention, various air blown enhancements are used to increase the laminar flow and maintain the label tightly against the container.

Figure 12:
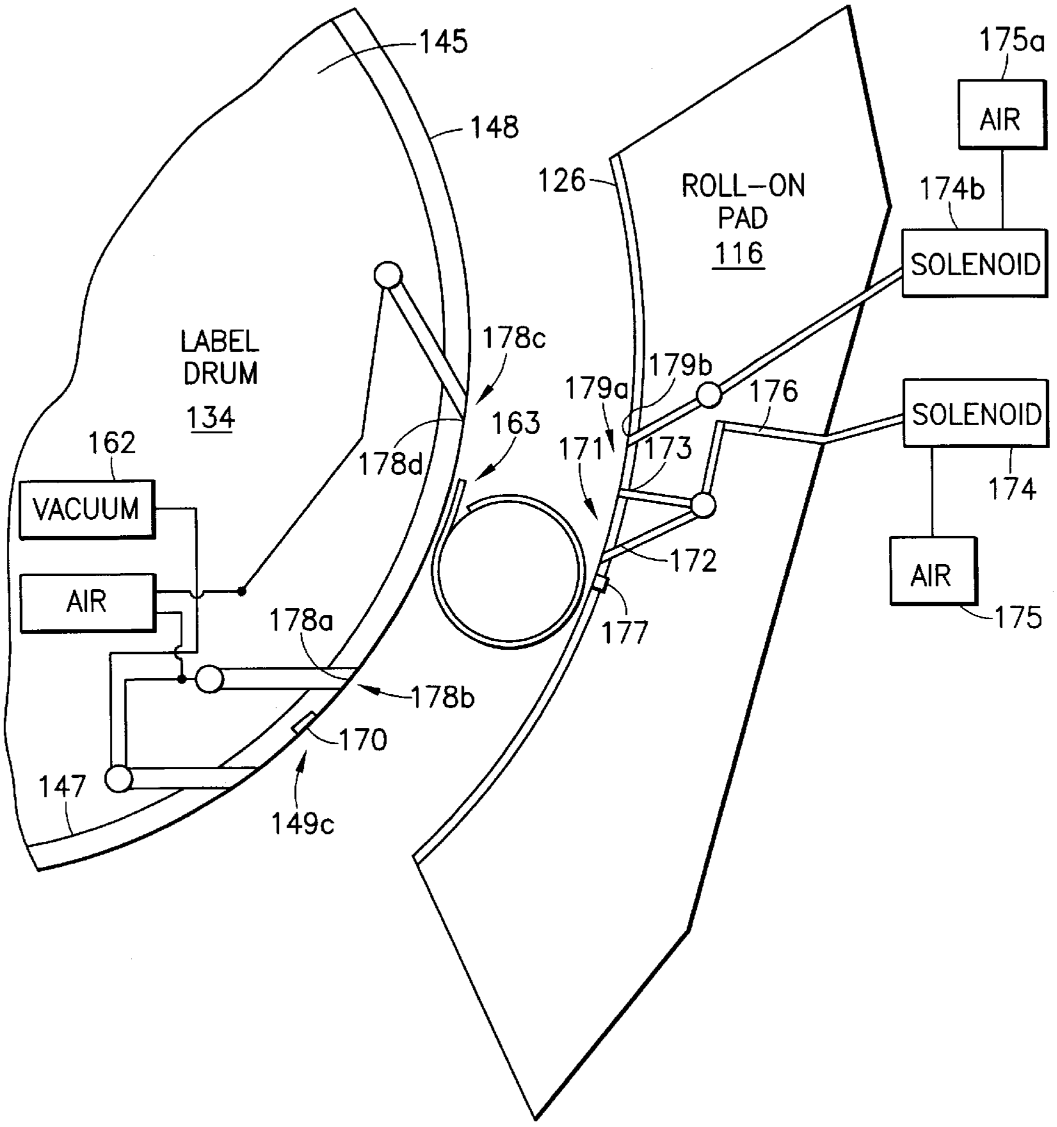
FIG. 12 is a schematic view of an embodiment in accordance with the present invention showing a partially wrapped container fed between the roll-on pad and label drum where air can be blown from different positions on the label drum or roll-on pad to enhance labeling.

Referring now to FIG. 12, an additionally angled set of orifices 178*a* can be located at a second position, indicated generally at 178*b* on the label drum. These orifices 178*a* are angled so that a jet of air can be discharged through the orifices in a direction backward along the area of the label drum from which the label had been placed. This jet of air is blown against both the label and the container to maintain a laminar flow over the label to keep it tight against the container until the label is pushed between the roll-on pad and the container.

In a third position indicated generally at 178*c* another set of orifices 178*d* are angled to blow against the front leading edge of the label, keeping the label tight against the container during the final part of the wrapping process until the wrap is finished. Typically, the air will blow on the leading edge when the container has made almost 360 degrees revolution to place the leading edge under the trailing edge of the label drum. This jet of air keeps the leading edge of the label tight against the container until the wrap is finished. This additional set of orifices located at the third position are advantageous especially with the use of stiff labels.

As shown in FIG. 12, at a second angled position indicated generally at 179*a* on the roll-on pad, another set of orifices 179*b* are angled so that a jet of air blows onto the label and container, and preferably the leading edge of the label at a point when the leading edge of the label passes its contact with the roll-on pad to blow the label tight against the container during the last part of the wrap. Orifices 179*b* may be fed air from its own solenoid valve 174*a*, or they may share the valve 174 and air 175 supplying orifices 172 and 173. Air supply 175*a* could supply air through solenoid valve 174*a*.

It is evident that the present invention allows enhanced labeling of containers because the curl in the label helps in adhesiveless labeling, especially on the leading edge. This is advantageous because a label can be stripped from a container without leaving a residue of adhesive on the container, which makes recycling of the container much more efficient and inexpensive.

It should be understood that the foregoing description of the invention is intended merely to be illustrative thereof, and that other embodiments, modifications, and equivalents may be apparent to those skilled in the art without departing from its spirit.

That which is claimed is:

1. A method of labeling cylindrical articles comprising the steps of feeding labels onto a label drum, wherein the labels have a formed curl such that the leading edge tends to curl away from the surface of the label drum, and feeding an article onto the label drum and wrapping the article with the label by engaging the article with the leading edge of the label and then wrapping the article.

2. A method of labeling according to claim 1 including feeding an uncut label web over an edge to impart a desired curl to the label web, cutting the label web into labels, and feeding the cut labels onto the label drum.

3. A method according to claim 2 including varying the tension of the label over the edge to vary the amount of curl imparted to the label.

4. A method according to claim 1 wherein the curl is imparted to the label by imparting curl to a label web before winding the label web into a finished roll to be used by a labeling machine.

5. A method according to claim 1 including applying an adhesive to the leading edge of the label.

6. A method according to claim 1 including applying an adhesive to the leading edge of the label while maintaining the area of the label adjacent the leading edge free of the adhesive.

7. A method according to claim 1 wherein the label includes leading and trailing edges, and a medial portion of the label defined between leading and trailing edges, and wherein the leading edge and medial portion are devoid of adhesive.

8. A method according to claim 1 wherein the label is devoid of adhesive.

9. A method according to claim 1 including assisting the curled label onto an article during wrapping by a method selected from the group of air blowing, electrostatic labeling, and wet adhesion by water or other volatile liquid.

10. A method according to claim 1 wherein the curl in the label is formed such that the curl is biased to curl into a diameter approaching the diameter of the finished article, or smaller.

11. A method of labeling articles comprising the steps of feeding labels onto a label drum, wherein the labels have a formed curl such that the leading edge tends to curl away from the surface of the label drum, and wherein the label defines leading and trailing edges, and a medial portion between the leading and trailing edges, and wherein at least the leading edge and medial portion of the label are devoid of adhesive.

feeding an article onto the label drum and wrapping the article with the label by engaging the article with the leading edge of the label and then wrapping the article.

12. A method of labeling according to claim 11 including feeding an uncut label web over an edge to impart a desired curl to the label web, cutting the label web into labels, and feeding the cut labels onto the label drum.

13. A method according to claim 12 including varying the tension of the label over the edge to vary the amount of curl imparted to the label.

14. A method according to claim 11 wherein the curl is imparted to the label by imparting curl to a label web before winding the label web into a finished roll to be used by a labeling machine.

15. A method according to claim 11 including assisting the curled label onto an article during wrapping by a method selected from the group of air blowing, electrostatic labeling, and wet adhesion by water or other volatile liquid.

16. A method according to claim 11 wherein the curl in the label is formed such that the label is biased to curl into a diameter approaching the diameter of the finished article, or smaller.

17. An apparatus for labeling cylindrical articles comprising a rotatable label drum, means for feeding labels onto the surface of the label drum, wherein the labels have a formed curl such that the leading edge tends to curl away from the surface of the label drum, and means for feeding an article onto the label drum and engaging the article with the leading edge of the label for wrapping of the article.

18. An apparatus according to claim 17 including an edge over which an uncut label web is fed to impart a desired curl onto the cut label.

19. An apparatus according to claim 18 including means for varying the tension of the label web fed over the edge to vary the amount of curl imparted to the label.

20. An apparatus according to claim 17 including a finished roll of label web from which label web is unwound to be cut into labels, and wherein the curl in the label is formed in the finished roll of label web.

21. An apparatus according to claim 17 including an adhesive applicator for applying an adhesive to the leading edge of the label.

22. An apparatus according to claim 17 including an adhesive applicator for applying an adhesive to the leading edge of the label while maintaining the area of the label adjacent the leading edge free of adhesive.

23. A apparatus according to claim 17 wherein the label includes leading and trailing edges, and a medial portion of the label defined between leading and trailing edges, and wherein the leading edge and medial portion are devoid of adhesive.

24. An apparatus according to claim 17 wherein the label is devoid of adhesive.

25. An apparatus according to claim 17 including means for assisting the curled label onto an article during wrapping.

26. An apparatus according to claim 25 wherein said means for assisting is selected from the group of air blowing, electrostatic labeling, and wet adhesion by water or other volatile liquid.

27. An apparatus according to claim 17 wherein the curl in the label is formed such that the curl is biased to curl into a diameter approaching the diameter of the finished article.

28. An apparatus for labeling cylindrical articles comprising a rotatable label drum, means for feeding labels onto the surface of the label drum, wherein the labels have a formed curl such that the leading edge tends to curl away from the surface of the label drum, and wherein the labels have leading and trailing edges, and a medial portion defined between leading and trailing edges, and wherein at least the leading edge and the medial portion of the label are devoid of adhesive, and means for feeding an article onto the label drum and engaging the article with the leading edge of the label for wrapping of the article.

29. An apparatus according to claim 28 including an edge over which an uncut label web is fed to impart a desired curl onto the cut label.

30. An apparatus according to claim 29 including means for varying the tension of the label web fed over the edge to vary the amount of curl imparted to the label.

31. An apparatus according to claim 28 including a finished roll of label web from which label is unwound to be cut into labels, and wherein the curl is formed in the finished roll of label web.

32. An apparatus according to claim 28 including a finished roll of label web from which label web is unwound to be cut into labels, and wherein the curl in the label is formed in the finished roll of label web wherein the curl is imparted to the label by imparting curl to a label web before winding the label web in a finished roll to be used by a labeling machine.

33. A method according to claim 28 wherein the curl in the label is formed such that the curl is biased to curl into a diameter approaching the diameter of the finished article, or smaller.

34. A method for labeling articles comprising the steps of feeding labels onto a label drum, wherein the labels have a formed curl such that the leading edge tends to curl away from the surface of the label drum, feeding an article to be labeled into a label applying position, blowing air from a first position on the label drum onto the leading edge of the label at an angle to the label drum surface and in a direction backward along the label from the leading edge to force the leading edge of the label against the article, after the leading edge of the label has engaged the article, blowing air from a second position on the label drum spaced from the first position and onto the label and article at an angle to the label drum surface to maintain a laminar flow of air against the label and maintain the label tight against the article during article rotation, and maintaining the leading edge of the label against the article while rotating the article so that the label is fully wrapped about the article.

35. The method according to claim 34 including feeding an uncut label web over an edge to impart a desired curl to the label web, cutting the label web into labels, and feeding the cut labels onto the label drum.

36. The method according to claim 34 including the step of blowing air from a third position on the label drum spaced from first and second positions onto the leading edge of the label after the article has rotated almost 360 degrees to maintain the label tight against the article during the final part of the wrapping process.

37. The method according to claim 34 wherein the leading edge of the label is maintained by wet adhesion.

38. The method according to claim 34 including the step of securing the trailing edge to the leading edge by an adhesive applied onto the trailing edge.

39. The method according to claim 34 including the step of blowing air onto the label and article from a first angled position on the side opposite the label drum to aid in maintaining the leading edge of the label against the article, while also blowing air from a second angled position on the side opposite the label drum to help maintain the label tight against the article during the final part of the wrapping process.

40. An apparatus for labeling articles comprising a label drum having a surface on which labels having leading and trailing edges are retained, and rotatable for moving labels into a label applying position, means for feeding labels on the surface of the label drum, wherein the labels have a formed curl such that the leading edge tends to curl away from the surface of the label drum.

an article feed for feeding an article into the label applying position, means for blowing air outward from a first position on the label drum onto the leading edge of the label at an angle to the label drum surface and in a direction backward along the label from the leading edge to force the leading edge of the label against the article, means for blowing air after the leading edge has engaged the article from a second position on the label drum spaced from the first position onto the label and article at an angle to the label drum surface to maintain a laminar flow of air against the label and help keep the label tight against the article during article rotation, and means for maintaining the leading edge of the label against the article while rotating the article so that label is fully wrapped about the article.

41. The apparatus according to claim 40 including means for blowing air from a third position on the label drum spaced from first and second positions onto the leading edge of the label after the article has rotated almost 360 degrees to maintain the label tight against the article during the final part of the wrapping process.

42. The apparatus according to claim 40 wherein said means for maintaining the leading edge of the label comprises a film of liquid on the article for wet adhesion of the leading edge to the article.

43. The apparatus according to claim 40 including an adhesive applicator for applying adhesive to the trailing edge of the label for securing the trailing edge to the leading edge when the label wraps about the article and the trailing edge overlaps the leading edge.

44. The apparatus according to claim 40 wherein said means for maintaining the leading edge of the label against the article comprises means for blowing air onto the label and article from a first angled position spaced outward from the label drum onto the label, and means for blowing air onto the label and article from a second angled position spaced outward from the label drum and spaced from the first position to help maintain the label tight against the article during the final part of the wrapping process.

45. The apparatus according to claim 15 including an edge over which an uncut label web is fed to impart a desired curl.

* * * * *